Nov. 2, 1926. 1,605,374
G. E. PÖTZSCHE
MOLDING MACHINE WITH STAMPING DEVICE AND ENDLESS CHAIN FOR MOVING
THE CASTING BOXES
Filed May 8, 1922 2 Sheets-Sheet 1
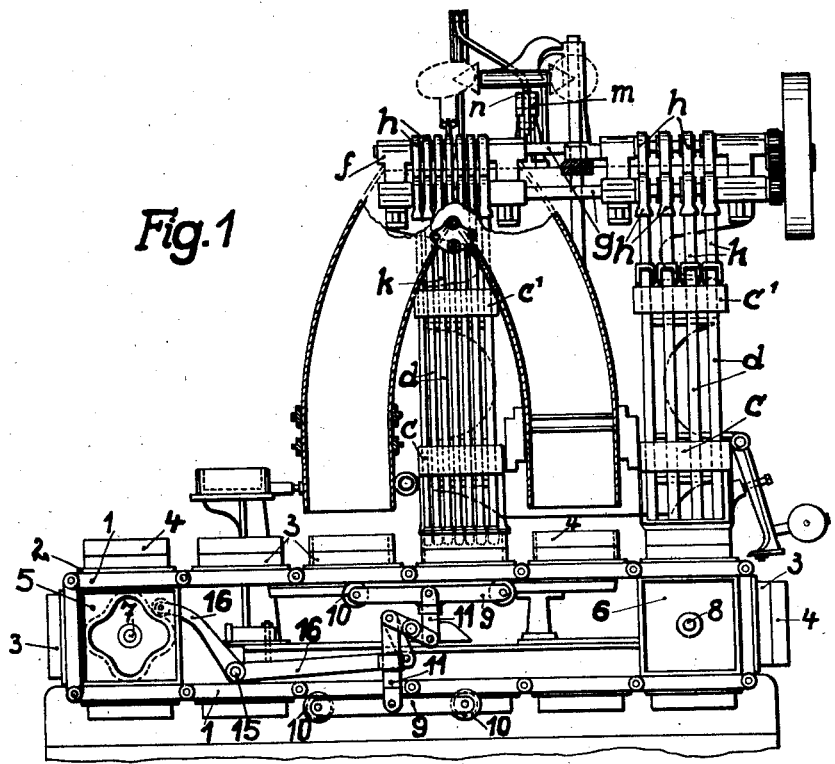
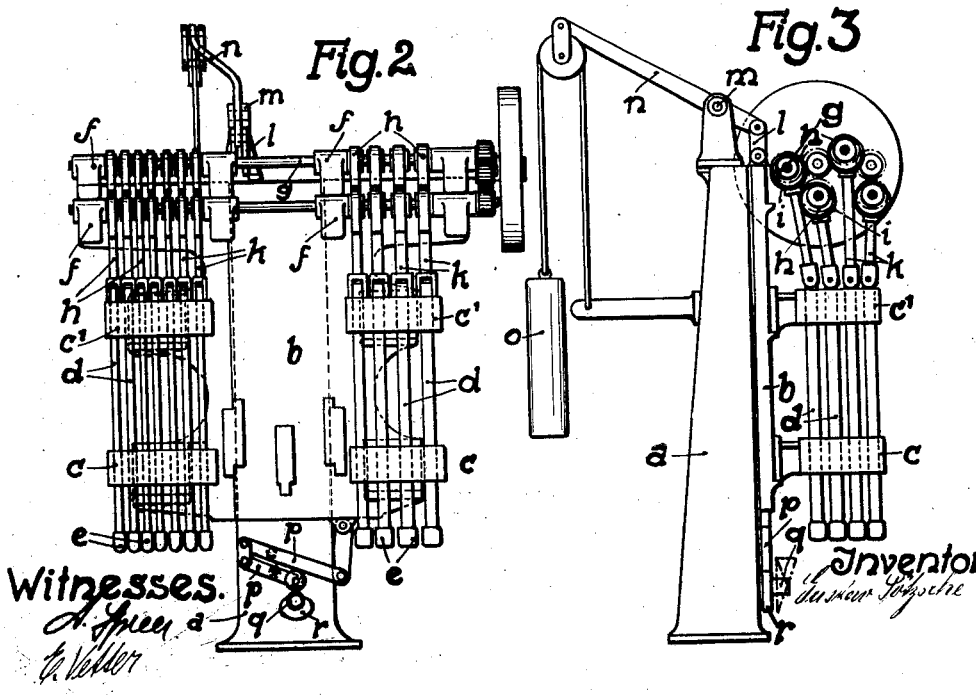
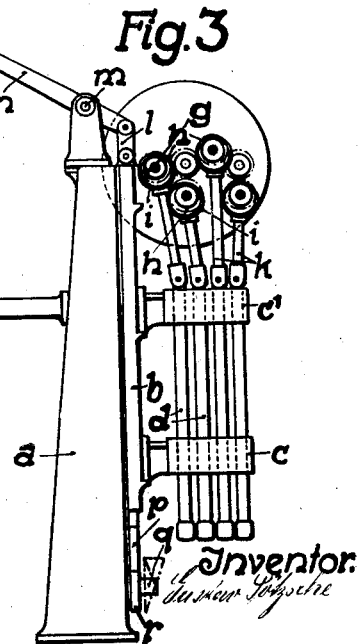

Nov. 2, 1926.  
G. E. PÖTZSCHE  
1,605,374  
MOLDING MACHINE WITH STAMPING DEVICE AND ENDLESS CHAIN FOR MOVING  
THE CASTING BOXES  
Filed May 8, 1922  
2 Sheets-Sheet 2

Witnesses.

Inventor.

Patented Nov. 2, 1926.

1,605,374

UNITED STATES PATENT OFFICE.

GUSTAV EMIL PÖTZSCHE, OF LEIPZIG-STOTTERITZ, GERMANY, ASSIGNOR OF ONE-HALF TO KURT PILTZ, OF LEIPZIG, GERMANY.

MOLDING MACHINE WITH STAMPING DEVICE AND ENDLESS CHAIN FOR MOVING THE CASTING BOXES.

Application filed May 8, 1922. Serial No. 559,454.

With the known molding machines as employed for producing casting molds the boxes for molding the pattern are in many cases connected with each other like links of a chain, and this chain is moved in jerks or steps, there being interruptions where the various working phases, such as filling in the molding sand, compressing this latter, and the like, take place. Compressing is generally effected by special pressing members which are suspended from bars and moved downwards and upwards like a piston or plunger. The whole weight of such members or bodies is rather great, whereby the means provided for lifting it is so loaded that a great expenditure of power is necessary to actuate the parts concerned.

The various drawbacks connected with the known constructions are overcome by the novel construction forming the subject-matter of the present invention which consists in distributing the sets of pressing bodies (each set consisting of a plurality of stampers arranged side by side in a series or in a plurality of parallel series) upon two working stations and a plurality of lifting shafts, the two stamping devices thus formed balancing each other and being carried at the machine frame by a slide balanced by a counter-poise.

To effect the step-by-step motion of the endless chains carrying the casting molds these chains are conducted over end-members of suitable transverse shape, and to prevent the chains from slacking during the time in which the casting boxes are moved from one place to the next a system of levers is provided between the upper and the lower members of the chains, and supporting rails for the upper chain members are lifted and lowered by said system of levers corresponding to the vertical motion of said chain members upwards and downwards as brought about by the rotary motion of the said end-members of the endless chain. The system of levers is actuated by a rotary member connected with one of the said end-members and rotating with it and moving a double-armed lever, one arm of which is in contact with said rotary member and the other arm of which is hinged to the said system of levers, as is all fully described hereinafter.

Figure 4:
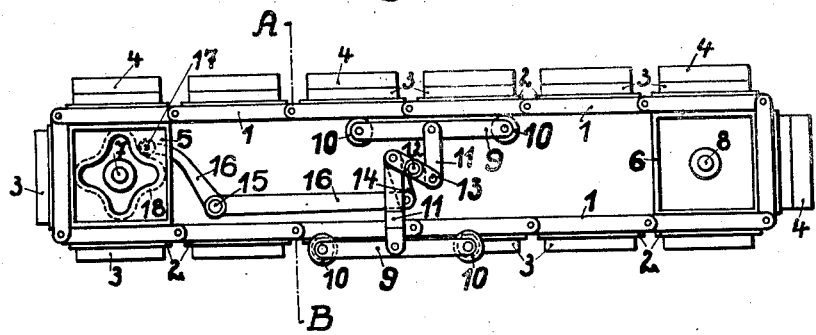
Figure 5:
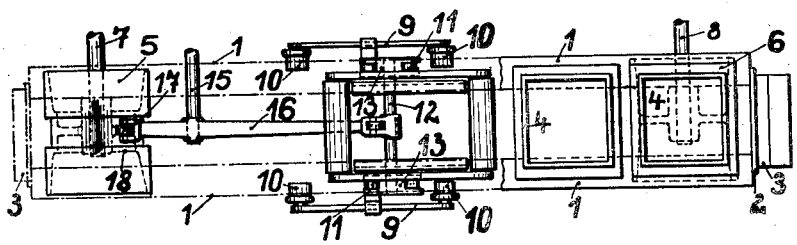
Figure 6:
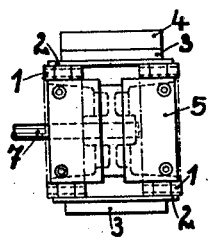
Figure 7:
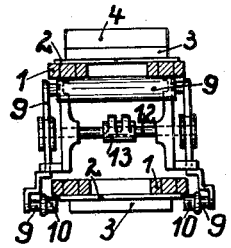

In order to make my invention more clear, I refer to the accompanying drawings, in which similar letters denote similar parts throughout the several views and in which Figure 1 is a front-view of the machine; Figure 2 is a front-view only of the stamping device; Figure 3 is a side view of this device; Figure 4 is a front-view only of the endless chains with their supporting means and some casting boxes; Figure 5 is in its righthand half a plan of the corresponding parts of Figure 4, and in its lefthand half a plan of the double-armed lever actuating the system of levers located between the upper and the lower chain members, and of the rotary member for operating said double-armed lever. Figure 6 is a front view of the endless chain seen from the left side of the machine, and Figure 7 is a vertical transverse section through the endless chain and the means for actuating it.

Referring first to Figures 2 and 3, which show the stamping device the standard $a$ has attached to it a vertically moveable slide $b$ provided with a pair of lower brackets $c$ and a pair of upper brackets $c^1$. These brackets form guides for two sets of vertical rods $d$, each of which has attached to it at its lower end a stamper. The brackets $c$ $c^1$ are attached to lateral extensions of the slide $b$. Above these extensions and brackets are lateral bearings $f$ supporting a plurality of horizontal shafts $g$, each of which has attached to it a plurality of eccentric disks $h$, and each of these disks is encompassed by a ring $i$ forming the upper end of a connecting rod $k$ hinged at its lower end to one of the stamper bars $d$. The eccentrics $g$ $h$ $i$ $k$ of the one set counter-balance those of the other set. One of the shafts $g$ has at its free end affixed to it a pulley and a cog-wheel which latter meshes with a cog wheel affixed to the free end of another shaft $g$ whereby the rotary motion is transmitted. Other cog-wheels provided between the bearings $f$ $f$ of the lefthand side and of the righthand side transmit the motion to the other shafts and thus to the other eccentrics operated by them. It is obvious that all stampers are actuated, i. e. moved up and down, by applying power to the pulley of the machine.

Owing to the construction of the machine as described in this part of the specification, the weight of the stampers, the bars and rods, and the eccentrics, is distributed upon a plurality of shafts; furthermore, since there are two sets of stampers, two casting boxes may be acted upon at a time, in such a manner, that the molding sand is preliminarily stamped in the one box and finally stamped in the other box, which is advantageous for the molding.

The rods $d$ may be bipartite and the two parts may be connected with each other by a spring which transmits the power from the upper rod half to the lower one so that the stampers push elastically upon the sand and yield elastically.

The slide $b$ is suspended from one arm of a double-armed lever $n$ by the mediation of a link $l$, and the other arm of said lever is under the pull of a poise, or counter-poise respectively, $o$, the proportions being such that the slide with the parts carried by it has only so much over-weight as just to be able to sink.

Below the slide $b$ are two double-armed levers $p$ $p$, which are connected with each other at one end by a link. The other end of the upper lever is connected by a link with the slide, and the other end of the lower lever is provided with a roll which cooperates in intervals with a cam $r$ affixed to a shaft $q$ which is intermittently rotated by the machine. It is obvious that the slide, etc., may be lifted and lowered by the just-described means, and when lifted the stampers are so much above the casting boxes that they may be horizontally shifted and vertically lifted in such a measure as made necessary by the manner of operation of the endless chain, as already described. Lifting the slide, etc., as high as necessary by the cam $r$ does not require a great expense of power because the parts to be lifted are nearly balanced by the poise $o$, as also already described.

Referring now to Figures 4-7, there are two parallel endless chains 1, 1 which are connected with each other by plates 2, each of which has attached to it a plate 3 consisting preferably of plaster of Paris or the like and forming the supports proper for the casting boxes 4 which may be secured in place upon said plates 3 by any appropriate means. The chains 1 are supported by two cubic bodies or members 5 and 6 supported in their turn by shafts 7 and 8 by which said parts 5 and 6 are intermittently turned, in such a manner, that the lefthand surface of 5 becomes its upper surface and the upper surface of 6 becomes its righthand surface. The plates 2 and 3, and the boxes 4, are thus moved in a step-by-step motion, there being always a certain interval between two such motions.

When commencing work, a casting box is put upon that plate 3 which is located just upon the supporting member 5 of the endless chains, and is affixed to that plate by the means provided for that purpose. The cubic members 5 and 6 are turned in certain intervals by 90 degrees, and whilst a casting box is at rest at any of the places of its path the certain molding manipulations take place. Having arrived above the member 6 where the second stamping is effected, the next part-rotation of this member brings the respective box into vertical position when it is disconnected from the respective plate 3. At the same time another box is affixed to that plate 3 which is just above the supporting member 5. This procedure is continued as long as the machine is in operation, or until all casting boxes have been dealt with respectively.

At every part rotation of the supporting members 5 and 6 the lower chain links are lowered and the upper ones are raised corresponding to the difference between the short and the long diameter of each of said members, viz, diagonally and not diagonally, and, of course, also the plates 2 and 3, as well as the boxes 4, are thus lifted. These changes of the path of the chains and of the parts therewith connected do not allow of providing a special guide table, but without any guide at all in horizontal direction at least the upper chain links would slack which must be prevented. To prevent it, two parallel supporting rails 9 9 are provided just below the upper chain links; each of them has rolls 10 10 at its ends and is supported in its turn by, and connected with, a vertical link 11 hinged at its upper end to the respective rail and at its lower end to a lever 13 affixed to a horizontal transverse shaft 12 suitably supported in the frame of the machine. Between the two levers 13 a third lever or arm 14 is affixed to the shaft 12, and this lever or arm is movably connected with one end of a double-armed lever 16 which is supported by a spindle 15 and the other arm of which bears against a quadruple cam 18 affixed to the shaft 7. A similar arrangement and combination of parts 9 10 11 12 13 is provided for the lower chain links, as shown in Figures 4 and 7, and the object of these latter parts is the same as that of the upper parts 9 10 11 12 13, viz, supporting the chain links during the time in which the upper links are raised and the lower ones are lowered owing to the members 5 and 6 making a part rotation, as described. There is, thus, no slacking at all; the proper tension in the endless chains is always maintained.

Having now described my invention, what I desire to secure by a patent of the United States is:

1. An automatic molding machine, comprising, in combination; endless chains composed of links adapted to support the casting boxes; end-members having quadrangular sections and supporting said chains; means for moving the chains with the parts they carry in a step-by-step motion; stampers arranged above the said chains; a vertically movable slide carrying said stampers; means for guiding said slide; and means for counterbalancing it, substantially as described and shown.

2. An automatic molding machine, comprising, in combination; endless chains composed of links adapted to support the casting boxes; end-members having quadrangular sections and supporting said chains; means for moving the chains with the parts they carry in a step-by-step motion; a vertically movable slide; means for guiding it; brackets projecting horizontally forth from said slide at its lefthand side and at its righthand side; two sets of stampers guided in said brackets; and means for reciprocating the said slide, for the purpose set forth.

3. An automatic molding machine, comprising, in combination; endless chains composed of links adapted to support the casting boxes; end-members having quadrangular sections and supporting said chains; means for moving the chains with the parts they carry in a step-by-step motion; a vertically movable slide; means for guiding it, brackets projecting horizontally forth from said slide at its lefthand side and at its righthand side; two sets of stampers guided in said brackets; shafts supported at the upper part of the slide; eccentrics attached to said shafts; power-transmitting connections between said eccentrics and said stampers, and means for driving the said shafts; substantially as set forth.

4. An automatic molding machine, comprising, in combination; endless chains composed of links adapted to support the casting boxes; end-members having quadrangular sections and supporting said chains, means for moving the chains with the parts they carry in a step-by-step motion; stampers arranged above the said chains; a vertically movable slide carrying said stampers; means for guiding said slide; means for counterbalancing it, supporting rails provided below the upper chain links and the lower ones and being movable in vertical direction; connections between the upper rails and the lower ones and being adapted to lift the upper rails and at the same time the lower ones synchronously with lifting and lowering the respective chain links by said quadrangular end members; a multiple cam connected with one of said end members; and a double-armed lever bearing at one end against said cam and being connected at its other end with said rail connections, substantially and for the purpose as described.

GUSTAV EMIL PÖTZSCHE.